United States Patent [19]

Richardson

[11] Patent Number: 5,167,072
[45] Date of Patent: Dec. 1, 1992

[54] DIRECTIONAL PLOTTER FOR UNDERWATER SEARCHES

[76] Inventor: Eric Richardson, 601 E. Eighth St., El Dorado, Ark. 71730

[21] Appl. No.: 685,757

[22] Filed: Apr. 16, 1991

[51] Int. Cl.⁵ .................. G01C 21/20; G09B 29/10
[52] U.S. Cl. .................................. 33/15 D; 33/431; 235/88 N; 235/83; 235/61 NV
[58] Field of Search ............ 33/403, 431, 457, 15 D, 33/1 CC, 1 C, 1 G, 562; 235/61 NV, 88 R, 88 N, 83; 434/153, 111

[56] References Cited

U.S. PATENT DOCUMENTS

| | | | |
|---|---|---|---|
| 2,560,590 | 7/1951 | Ocker | 235/83 |
| 2,618,856 | 11/1952 | Sweet | 33/15 D |
| 2,996,242 | 8/1961 | Bannister | 33/15 D |
| 3,100,601 | 8/1963 | Shapiro | 235/88 N |
| 3,315,887 | 4/1967 | Martin, Jr. | 235/61 NV |
| 3,614,393 | 10/1971 | Sanderson | 235/61 NV |
| 3,721,007 | 3/1973 | Banner | 33/15 D |

*Primary Examiner*—William A. Cuchlinski, Jr.
*Assistant Examiner*—C. W. Fulton
*Attorney, Agent, or Firm*—Diller, Ramik & Wight

[57] ABSTRACT

A directional plotter for underwater searches, land searches, land orienting, or the like includes a pair of first and second relatively rotatable discs with the first disc including first, second and third concentric sets of compass degrees in radially adjacent relationship to each other. The second disc includes first, second and third sets of apertures associated with the first, second and third concentric sets of compass degrees. The two discs are relatively rotatable such that different search patterns can be established by rotating the discs relative to each other and viewing the required degrees for a particular search pattern through the associated apertures.

19 Claims, 3 Drawing Sheets

FIG_3

DIRECTIONAL PLOTTER FOR UNDERWATER SEARCHES

BACKGROUND OF THE INVENTION

Divers utilize a variety of different searches for efficiently locating an underwater search object, such as a circular search which, though accurate, requires the use of an anchored line or a line held by the diver's buddy. The line is held taut, the diver swims a circle, and if the object is not found, more line is released and the diver repeats the circular search along another circle with ever-expanding circles being utilized until the search object is found. A circular search pattern is particularly useful when looking for a small item in a relatively small area, and this pattern also helps the diver maintain an accurate search in the presence of currents or surge.

Controlled searches include several patterns which are controlled by divers swimming on the surface, a guide walking on shore, or a boat motoring slowly. For most of these patterns, a team of divers work side-by-side along a rope stretched out across the bottom.

However, in lieu of such multiple-diver searches, often a single diver is required or desires to make an underwater search without assistance and might, for example, utilize a U-pattern search which neither requires a rope nor a buddy. A diver would, for example, swim an "up" leg at a predetermined number of kicks, an "across" leg at a predetermined of kicks, a "down" leg at a predetermined number of kicks (generally corresponding to the number of kicks of the "up" leg), another "across" leg, etc. The diver swims successive legs 90 degrees relative to each other to cover the bottom terrain.

A so-called expanding square pattern search is similarly effected by a diver swimming successive 90 degree related legs with progressively increasing kicks per leg with all legs being swum in either a clockwise or a counterclockwise direction. The expanding square pattern technique is particularly useful over rough bottom terrain in calm water.

Experienced divers have little difficulty in conducting such solo U-pattern, expanding square pattern or similar (triangular or "flag") patterns, but even seasoned divers at times encounter difficulties. Amateur or less experienced divers encounter difficulties in navigating such pattern searches for a variety of reasons, such as simply not trusting compass readings. A triangular or "flag" pattern requires turns of 120 degrees to remain on course, yet even seasoned divers frequently think that 60 degree turns make up a triangular dive pattern and such a mistake prevents accurate searching and places the diver far from where the diver would like to be at the completion of the search.

SUMMARY OF THE INVENTION

In keeping with the foregoing, it is a primary object of the present invention to provide a novel directional plotter which divers can use for effecting accurate underwater searches, be they U-pattern searches, expanding square pattern searches, reciprocal searches, triangular ("flag") searches, or the like.

The directional plotter of this invention includes first and second discs which are mounted for rotation relative to each other with a first of the discs having three concentric sets of compass degrees and a second of the discs having a plurality of openings or apertures therein. Radially adjacent compass degrees of the three sets of compass degrees are identical and the openings are so constructed and arranged as to define three different search patterns with one search pattern being associated with each of the first, second and third concentric sets of compass degrees.

In further accordance with this invention, the openings are also so constructed and arranged that various ones of the compass degrees are not only viewable therethrough, but two different degrees are viewable through two openings of each of the first through third sets of openings with the two degrees so viewed differing from each other by one of 90 degrees 120 degrees and 180 degrees, depending upon the particular search pattern involved.

DESCRIPTION OF RELATED ART

A variety of instruments are available Which involve at least two discs relatively rotatable with respect to each other, and such instruments are designed to form a variety of functions. As examples, U.S. Pat. No. 3,432,927 issued to Earl W. Springer discloses a Turn Computer; U.S. Pat. No. 2,329,274 issued to Lowell V. Lamoreaux discloses an orienting or surveying device; U.S. Pat. No. 2,560,590 issued to John M. Ocker discloses an instrument to achieve zig zag evasive ship maneuvers; U.S. Pat. No. 4,689,476 issued to Joseph Katz discloses a marine calculator for providing distance information relating to dogleg or zig zag courses to a destination station; U.S. Pat. No. 3,578,241 issued to Phillip J. Wombough discloses a circular slide rule for use by scuba divers which coordinates such variables as air tank pressure, depth of submergence, breathing rate and time; U.S. Pat. No. 2,969,179 issued to D. J. Capuano discloses a calculating device which establishes the shortest interception path between a moving target and an interceptor; U.S. Pat. No. 3,231,188 issued to L. A. Warner discloses a computer for solving a variety of aircraft/flight navigation problems; and U.S. Pat. No. 3,876,866 issued to Peter D. Kaspar discloses a navigational calculator for solving vector problems. None of the latter patents are directed to a directional plotter particularly adapted for underwater searches, nor one specifically designed as set forth earlier herein.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
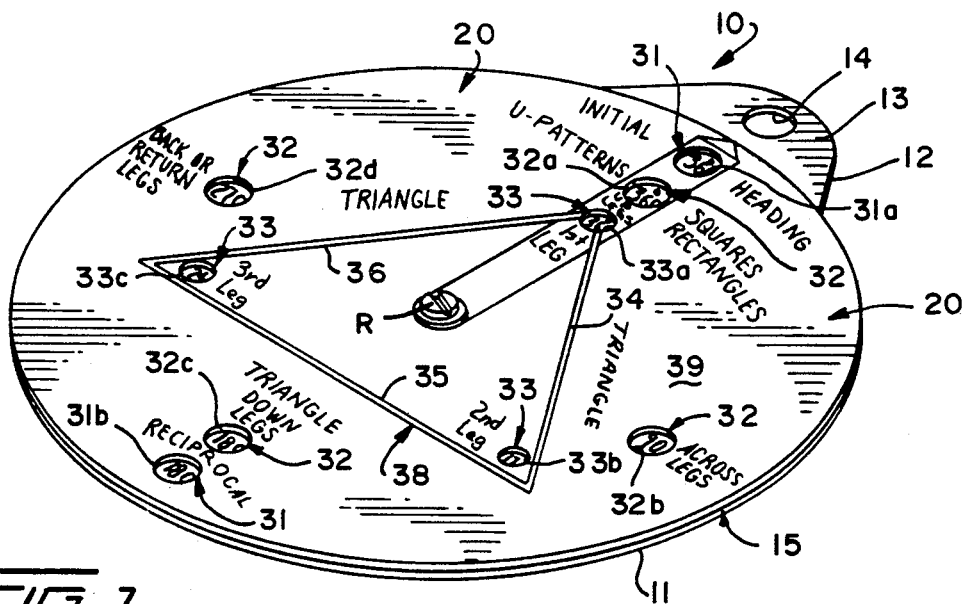
FIG. 1 is a perspective view of a novel directional plotter constructed in accordance with this invention which is particularly adapted for underwater searches, and illustrates two generally circular discs, the first of which includes three sets of concentric compass degrees and the second of which includes a plurality of apertures or openings through which the compass degrees can be viewed to establish turn degrees of different search patterns.
Figure 3:
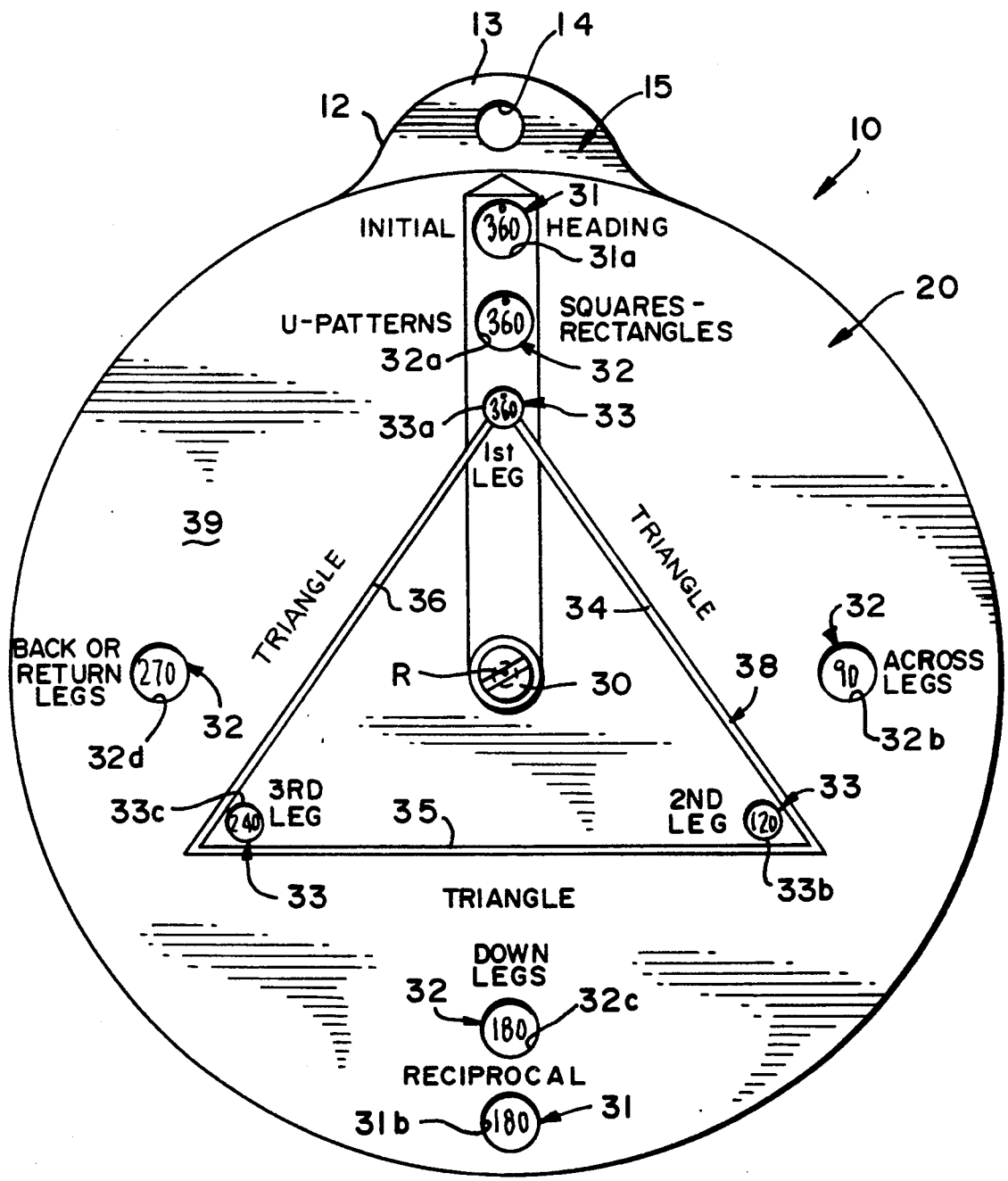
FIG. 3 is a top perspective view of the directional plotter of FIG. 1 and illustrates one relative position of the two rotatable discs or members from which turn degrees for a number of different search patterns are determined.

A novel directional plotter particularly adapted for underwater searches constructed in accordance with this invention is illustrated in FIGS. 1 and 3 of the drawings and is generally designated by the reference numeral 10.

The directional plotter or calculator 10 includes first and second relatively rotatable circular members or discs 15, 20 joined at a common axis of rotation R (FIGS. 2 and 3) by a conventional pivot pin 30. The first member 15 and the second member 20 are both preferably constructed from high impact resistant synthetic polymeric/copolymeric plastic material, and each disc 15, 20 is preferably white in color and opaque to effect better visibility under water.

The first member or disc 15 includes an outer generally circular peripheral edge 11 which blends with a radially outwardly projecting edge 12 defining a handgripping tab 13 having an opening 14 formed therein. The opening 14 can be hooked to the clip of a lanyard which is in turn connected to the clothing of the diver.

The first member 15 has a front surface 16 (FIG. 2) and a rear surface (not shown) which is completely blank and devoid of any indicia whatever in order that the rear surface can serve as a slate or writing surface. The front surface 16 of the first member or disc 15 has first, second and third concentric sets 21-23, respectively, of compass degrees 25 printed or otherwise provided thereon. All generally radially adjacent compass degrees 25 of the three sets 21-23 of compass degrees are identical and increase in intervals of 10 degrees. In other words, the "360" compass degrees 25 of all three sets 21-23 are radially adjacent to each other, and the compass degrees 25 of each set 21-23 are in 10 degree multiples, for example, "40," "50," "60," etc. The ten degree difference between circumferentially adjacent compass degrees of the sets 21-23 is selected merely as a matter of convenience.

The second member or disc 20 includes first, second and third aperture means 31, 32 and 33, respectively, in the form of apertures or openings of a circular configuration, although other configurations thereof are within keeping of this invention. The first through third aperture means 31-33 are constructed and arranged relative to the respective first through third concentric sets 21-23 of compass degrees 25 such as to define a plurality of different search patterns and at least two different degrees of each search pattern. Examples of the latter will be described hereinafter.

Figure 2:
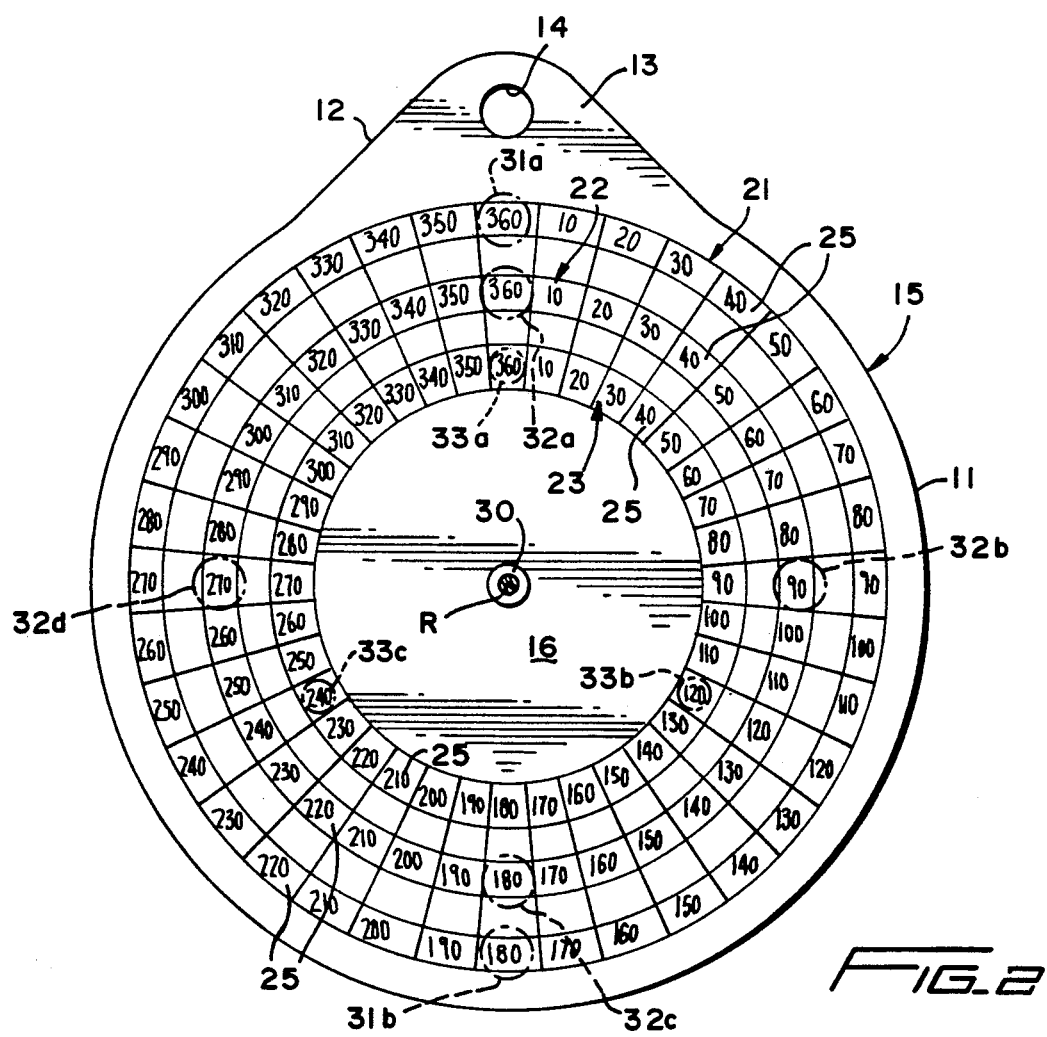
FIG. 2 is an enlarged top plan view of the first disc or member, and illustrates first, second and third concentric sets of compass degrees thereof with radially adjacent degrees being identical.

The first aperture means 31 are defined by circular openings or apertures 31a, 31b, which in FIGS. 1-3, are shown located at relatively twelve o'clock and six o'clock positions, respectively, and in overlying relationship to the first set 21 of compass degrees 25. As is best illustrated in FIG. 3, "360" is visible through the aperture 31a and "180" is visible through the aperture 31b.

The second aperture means 32 includes four circular openings or apertures 32a through 32d with each adjacent pair of apertures 32a through 32d being arcuately spaced 90° degrees from each other and with each aperture 32a through 32b being in overlying relationship to the second set 22 of compass degrees 25. Visible through the apertures 32a through 32d of the second disc or member 20 are the respectively degrees "360," "90," "180" and "270" (FIG. 3).

The third aperture means 33 includes three apertures or openings 33a through 33c with adjacent pairs being spaced 120 degrees from each other. The apertures 33a through 33c are also in overlying relationship to the third set 23 of the compass degrees 25, and as is best illustrated in FIG. 3, "360," "120" and "240" are visible through the respective apertures 33a through 33c. A triangle 38 is printed upon a surface 39 of the member 20 and is defined by lines 34, 35 and 36. The line 34 extends generally between the apertures 33a, 33b; the line 35 extends generally between the apertures 33b and 33c; and the line 36 extends generally between the apertures 33a and 33c. Thus the apertures 33a through 33c are located generally one each at each included angle area (unnumbered) of the triangle 38. (Like lines could be provided on the surface 39 between the apertures 32a through 32d and these would similarly locate the apertures 32a through 32d, one each at each included angle of what would be a polygonal or square area set-off by the latter-defined lines.)

The surface 39 of the member or disc 20 also has indicia thereon as follows:

"INITIAL HEADING" is printed or otherwise suitably provided adjacent the aperture 31a.

"U-PATTERNS" and "SQUARES-RECTANGLES" are printed or otherwise suitably provided adjacent and respectively to the left and right, as viewed in FIG. 3, of the aperture 32a.

"ACROSS LEGS" is printed or otherwise suitably provided adjacent the aperture 32b.

"RECIPROCAL" is printed or otherwise suitably provided adjacent the aperture 31b.

"DOWN LEGS" is printed or otherwise suitably provided adjacent the aperture 32c.

"BACK OR RETURN LEGS" is printed or otherwise suitably provided adjacent the aperture 32d.

"TRIANGLE" is printed or otherwise suitably provided along each line 34-36 of the triangle 38.

"1 ST LEG" is printed or otherwise suitably provided adjacent the aperture 33a.

"2ND LEG" is printed or otherwise suitably provided adjacent the aperture 33b.

"3RD LEG" is printed or otherwise suitably provided adjacent the aperture 33c.

OPERATION OF THE INVENTION

Figure 4:
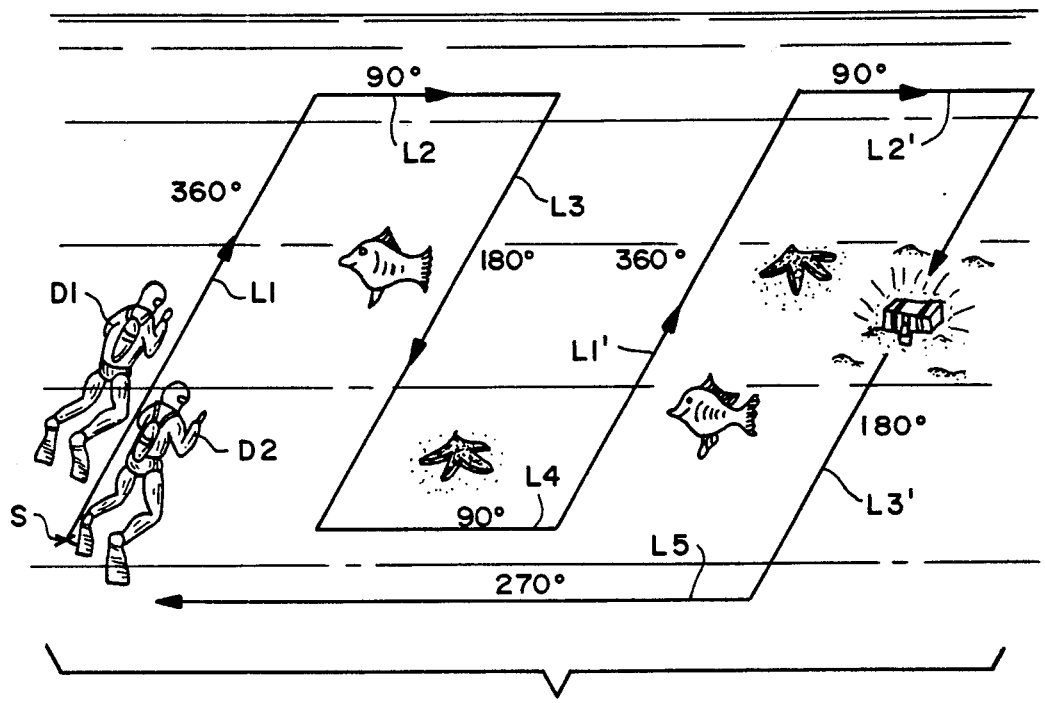
FIG. 4 is a schematic view and illustrates a U-pattern search.

Reference is made to FIG. 4 which illustrates divers D1, D2, either one or both of which is equipped with the directional plotter 10 of this invention, about to embark upon an underwater search to locate an object O. It is assumed that the divers D1, D2 have decided to conduct a U-pattern search and by utilizing a compass have decided to begin the search by swimming an initial or first leg L1 at an "INITIAL HEADING" (FIG. 3) of "360" degrees from a starting pont S (FIG. 4). Irrespective of the relative position of the discs 15, 20, once the divers D1, D2 have decided upon the latter specific initial heading, the discs 15, 20 are moved relative to each other until "360" appears in the aperture 31a, as shown in FIG. 3, and as is indicated in phantom outline in FIG. 2. From the starting point S (FIG. 4), the divers begin to swim the first leg L1 on the compass heading "360," and do so for a predetermined number of kicks (100, for example) depending upon the area to be searched, the clarity of the water, etc. After 100 kicks the divers then must change direction to swim the leg L2 and see through aperture 32b (FIGS. 1-3) that the correct heading for the next or "ACROSS LEGS" is "90" degrees viewable through the aperture 32b. Utilizing their compass, the divers D1, D2 then turn to the 90 degree heading and swim the leg L2 for a predetermined number of kicks (50, for example) and then again check the directional plotter 10 and find in viewing through the aperture 31b that the "RECIPROCAL" heading of the "INITIAL HEADING" is "180" degrees. The divers then turn to the 180 degree heading, swim along leg L3 for 100 kicks and next again check aperture 32b to swim another "ACROSS LEG" L4 at "90" degrees. At this point it should be noted that if the divers D1, D2 were interested in only swimming a closed square or polygonal search pattern, they would look through aperture 32d ("BACK OR RETURN LEGS") and swim the "270" degree heading visible therein which would return the divers D1, D2 along a leg L4' to the starting point S. However, to repeat the U-pattern search after completing the leg L3 the divers would proceed to duplicate the legs L1, L2, L3, etc. as is represented by the legs L1', L2' and L3' until the object O was found. Once found the leg L3' is completed on the "180" heading and upon its completion, aperture 32d ("BACK or RETURN LEGS") is viewed and the divers return along the "270" leg L5 until reaching the starting point S.

From the foregoing it is readily apparent that once the "INITIAL HEADING" has been set at the aperture 31a, all subsequent relative 90 degree turns are represented in the apertures 32a through 32d.

Figure 5:
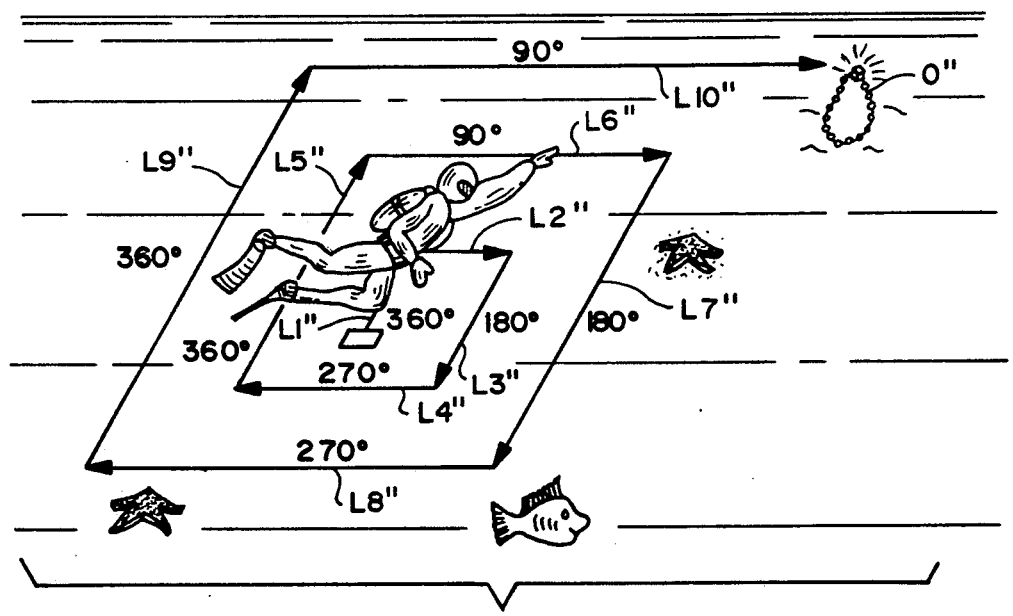
FIG. 5 is a schematic view and illustrates an expanding square pattern search.

The same setting of the directional plotter 10 illustrated in FIGS. 2 and 3 can also be utilized for an expanding square pattern search, as shown in FIG. 5. In this case a diver D1" swims a consecutive series of legs L1" through L10" before discovering a search object O". As in the case of FIG. 4, the diver D1" begins the leg L1" from a start point S" at a heading of "360" degrees and kicks a predetermined number of kicks before turning on the leg L2" which is the "90" "ACROSS LEGS" viewable through aperture 32b (FIG. 3). After a predetermined number of kicks the diver D1" then turns on the "180" heading of leg L3" which is the "RECIPROCAL" viewable through aperture 31b of the directional plotter 10. In this case the diver kicks more kicks along the leg L3" then along the leg L1" to increase or expand the search pattern and, contrary to the leg L4 of FIG. 4, next views through aperture 32d through which is seen "270" degrees as the heading of the leg L4". The latter leg is then swum, the diver views through the aperture 32a, and then swims the "360" heading along the leg L5", and this is repeated until the object O" is located.

Though not illustrated, a triangular course can be swum in the same manner. In the example setting of the directional plotter illustrated in FIG. 3, the first leg would be swum on the "360" heading of aperture 33a followed by a "120" heading visible through aperture 33b, and subsequently swimming a third leg at a heading of "240" degrees viewable through aperture 33c, thus completing the triangular or "flag" search pattern during which the diver necessarily unmistakenly makes a "120" turn from leg-to-leg.

Obviously, repetitious reciprocal searching or search patterns can be accomplished by simply viewing through apertures 31a and 31b and swimming reciprocal directions "180" degrees relative to each other.

Though the directional plotter 10 has been described by beginning each first leg at a heading of 360 degrees, obviously each first leg can be swum at virtually any setting desired. For example, if the compass degrees "20" were set in the openings 31a, 32a and 33a by rotating the members 15, 20 relative to each other, the compass degrees 200 would be viewable in the apertures 31b, 32c, the compass degrees "110" would be viewable in the aperture 32b, and the compass degrees "290" would be viewable in the aperture 32d. The latter obviously again reflect 90, 120 and 180 degree differences relative to the aperture means 32, 33 and 31, respectively, for utilization for appropriate searches as described heretofore.

Though the directional plotter 10 has been described specifically in conjunction with underwater searches, the directional plotter 10 can equally be utilized for on-land searches as, for example, locating missing children or adults who may have accidentally or inadvertently walked off into or have become lost in unmarked and/or wilderness terrain. The directional plotter can also be used for recreational or competitive land orienting or similar activities.

Although a preferred embodiment of the invention has been specifically illustrated and described herein, it is to be understood that minor variations may be made in the apparatus without departing from the spirit and scope of the invention as defined in the appended claims.

I claim:

1. A directional plotter particularly adapted for searches comprising first and second relatively rotatable members, said first member including at least first and second relatively concentric sets of compass degrees, generally radially adjacent compass degrees of said first and second concentric sets of compass degrees being identical, said second member including at least first and second aperture means for viewing therethrough the compass degrees of the respective first and second concentric sets of compass degrees, said first aperture means being generally located one at each included angle area of a triangle, said second aperture means being generally located one at each included angle area of a polygon, and said first and second aperture means being constructed and arranged relative to the respective first and second concentric sets of compass degrees to define two different search patterns and at least two degrees thereof.

2. The directional plotter as defined in claim 1 wherein said first member includes a third set of compass degrees in relatively concentric relationship to said first and second concentric sets of compass degrees, compass degrees of said third set of compass degrees disposed generally radially adjacent to said first and second compass degrees being identical thereto, said second member includes third aperture means for viewing therethrough the compass degrees of said third set of compass degrees, and said third aperture means being constructed and arranged relative to said third concentric set of compass degrees to define a third different search pattern and at least two degrees thereof.

3. The directional plotter as defined in claim 2 wherein said third aperture means are located diametrically opposite from each other.

4. The directional plotter as defined in claim 3 wherein said triangle is generally an equilateral triangle.

5. The directional plotter as defined in claim 3 wherein said polygon is generally a square.

6. The directional plotter as defined in claim 3 wherein said triangle is generally an equilateral triangle, and said polygon is generally a square.

7. The directional plotter as defined in claim 1 wherein said triangle is generally an equilateral triangle.

8. The directional plotter as defined in claim 1 wherein said polygon is generally a square.

9. The directional plotter as defined in claim 1 wherein said triangle is generally an equilateral triangle, and said polygon is generally a square.

10. A directional plotter particularly adapted for searches comprising first and second relatively rotatable members, said first member including first, second and third relatively concentric sets of compass degrees, generally radially adjacent compass degrees of said first, second and third concentric sets of compass degrees being identical, said second member including first, second and third aperture means for viewing therethrough the compass degrees of the respective first, second and third concentric sets of compass degrees, said first, second and third aperture means being constructed and arranged to define three different search patterns and at least two degrees thereof, and the two degrees defined by one of said first, second and third aperture means differ from each other by 180 degrees.

11. The directional plotter as defined in claim 10 wherein the two degrees of another of said first, second and third aperture means differ from each other by 90 degrees.

12. The directional plotter as defied in claim 11 wherein the two degrees of a final one of said first, second and third aperture means differ from each other by 120 degrees.

13. The directional plotter as defined in claim 10 wherein the two degrees of another of said first, second and third aperture means differ from each other by 120 degrees.

14. A directional plotter particularly adapted for searches comprising first and second relatively rotatable members, said first member including first, second and third relatively concentric sets of compass degrees, generally radially adjacent compass degrees of said first, second and third concentric sets of compass degrees being identical, said second member including first, second and third aperture means for viewing therethrough the compass degrees of the respective first, second and third concentric sets of compass degrees, said first, second and third aperture means being constructed and arranged to define three different search patterns and at least two degrees thereof, and the two degrees defined by one of said first, second and third aperture means differ from each other by 90 degrees.

15. A directional plotter particularly adapted for searches comprising first and second relatively rotatable members, said first member including first, second and third relatively concentric sets of compass degrees, generally radially adjacent compass degrees of said first, second and third concentric sets of compass degrees being identical, said second member including first, second and third aperture means for viewing therethrough the compass degrees of the respective first, second and third concentric sets of compass degrees, said first, second and third aperture means being constructed and arranged to define three different search patterns and at least two degrees thereof, and the two degrees defined by one of said first, second and third aperture means differ from each other by 120 degrees.

16. A directional plotter particularly adapted for searches comprising first and second relatively rotatable members, said first member including at least first and second relative concentric sets of compass degrees, generally radially adjacent compass degrees of said first and second concentric sets of compass degrees being identical, said second member including at least first and second aperture means for viewing therethrough the compass degrees of the respective first and second concentric sets of compass degrees, said first aperture means being located diametrically opposite from each other, said second aperture means being generally located one at each included angle area of a triangle, and said first and second aperture means being constructed and arranged relative to the respective first and second concentric sets of compass degrees to define two different search patterns and at least two degrees thereof.

17. The directional plotter as defined in claim 16 wherein said triangle in generally an equilateral triangle.

18. The directional plotter as defined in claim 17 wherein said polygon is generally a square.

19. A directional plotter particularly adapted for searches comprising first and second relatively rotatable members, said first member including at least first and second relatively concentric sets of compass degrees, generally radially adjacent compass degrees of said first and second concentric sets of compass degrees being identical, said second member including at least first and second aperture means for viewing therethrough the compass degrees of the respective first and second concentric sets of compass degrees, said first aperture means being located diametrically opposite from each other, said second aperture means being generally located one at each included angle area of a polygon, and said first and second aperture means being constructed and arranged relative to the respective first and second concentric sets of compass degrees to define two different search patterns and at least two degrees thereof.

* * * * *